United States Patent
Dung et al.

(10) Patent No.: US 7,807,836 B2
(45) Date of Patent: Oct. 5, 2010

(54) PREPARATION OF PERYLEN-3,4:9,10-TETRACARBOXYLIC DIANHYDRIDE AND ALSO OF NAPHTALENE-1,8-DICARBOXIMIDES

(75) Inventors: Bernhard Dung, Mannheim (DE); Felix Mueller, Frankenthal (DE); Arno Boehm, Mannheim (DE); Willi Helfer, Friedelsheim (DE); Volker Weyrauch, Deidesheim (DE); Georg Henning, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 64 days.

(21) Appl. No.: 11/955,605

(22) Filed: Dec. 13, 2007

(65) Prior Publication Data

US 2008/0161569 A1    Jul. 3, 2008

Related U.S. Application Data

(62) Division of application No. 10/510,579, filed as application No. PCT/EP03/03901 on Apr. 15, 2003, now Pat. No. 7,393,956.

(30) Foreign Application Priority Data

Apr. 25, 2002    (DE)    ............................ 102 18 618

(51) Int. Cl.
    C07D 471/16    (2006.01)
    C07D 471/00    (2006.01)
(52) U.S. Cl. .......................................... 546/37; 546/98
(58) Field of Classification Search ................ 546/37, 546/98
    See application file for complete search history.

(56) References Cited

U.S. PATENT DOCUMENTS

| 2,487,105 A | * | 11/1949 | Cornwell ................ 106/169.11 |
| 3,446,810 A |  | 5/1969 | Dien et al. |
| 4,197,111 A |  | 4/1980 | Pallos et al. |
| 4,919,848 A |  | 4/1990 | Harnisch |

FOREIGN PATENT DOCUMENTS

| DE | 276 9256 | 10/1913 |
| EP | 0 054 806 | 12/1980 |
| EP | 0 525 538 | 2/1993 |
| IN | 141 431 | 3/1977 |
| JP | 3-223282 | 10/1991 |
| JP | 9-194746 | 7/1997 |
| PL | 78 458 | 7/1975 |

OTHER PUBLICATIONS

Holtrup et al DN 126:36159a Chem. Abs (1997).*
Frank O. Holtrup, et al. "Terrylenimides: New NIR Fluorescent Dyes" Chem. Eur. J. 1997, 3, No. 2 (pp. 219-225).
Sakamoto, Takaaki et al. "Oxidative Coupling Reaction of 1,8-Naphthalimide a new synthetic methodology for the production of Perylene-3,4,9,10-Tetracarboximide", Kawamura Rikagaku Kenkyusho Hokoku, vol. 8, pp. 85-95, with English abstract & full English translation, (1997).
Sakamoto, Takaaki et al. "A 'Green' Route to Perylene Dyes: Direct Coupling Reactions of 1,8-Naphthalimide and Related Compounds under Mild Conditions Using a "New" Base Complex Reagent, t-BuOK/DBN", J. Org. Chem. vol. 66, pp. 94-98 2001.
Jankowski, Z. et al. "Synthesis and Properties of Some Derivatives of N-[4'-(1,2,3-Benzotriazolyl)-phenyl]-naphthalimide", Pol. J. Chem, vol. 55, No. 3, pp. 555-563 (abstract only), (1981).
Ganin, E. V. et al. "N-Substituted Isonaphthalimides. Peculiarities of Their Formation and Their Reaction with Amines", Zh. Org. Khim, vol. 21, No. 11, pp. 2415-2423 (abstract only) 1985.

* cited by examiner

*Primary Examiner*—Janet L. Andres
*Assistant Examiner*—Raymond Covington
(74) *Attorney, Agent, or Firm*—Oblon, Spivak, McClelland, Maier & Neustadt, L.L.P.

(57)    ABSTRACT

A process for preparing perylene-3,4:9,10-tetracarboxylic dianhydride, comprising: dimerizing a naphthalene-1,8-dicarboximide of the formula IIa;

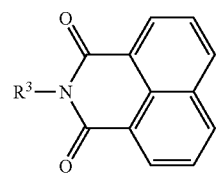

IIa reoxidizing the resulting alkali metal salt of the leuco form of the perylene-3,4:9,10-tetracarboxylic diimide of the formula Ia;

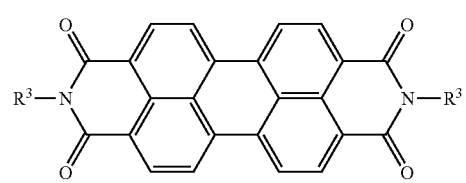

Ia hydrolyzing the diimide to the tetraalkali metal salt of perylene-3,4:9,10-tetracarboxylic acid in the presence of an inert organic solvent, of an alkali metal base and of water; and subjecting the tetraalkali metal salt of perylene-3,4:9,10-tetracarboxylic acid to the action of an aqueous inorganic acid to convert it into perylene-3,4:9,10-tetracarboxylic dianhydride; wherein $R^3$ is cyclohexyl or phenyl which may each be substituted by up to three $C_1$-$C_4$-alkyl radicals, and the dimerizing is in a substantially homogeneous reaction medium consisting essentially of an apolar aprotic organic solvent and an alkali metal base.

4 Claims, No Drawings

PREPARATION OF PERYLEN-3,4:9,10-TETRACARBOXYLIC DIANHYDRIDE AND ALSO OF NAPHTALENE-1,8-DICARBOXIMIDES

The present invention relates to a novel process for preparing perylene-3,4:9,10-tetracarboxylic diimides of the general formula I

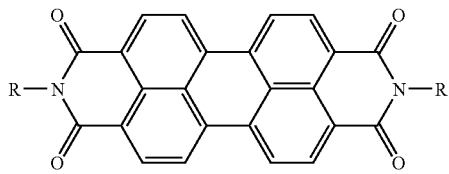

where

R is $C_1$-$C_{30}$-alkyl whose carbon chain may be interrupted by one or more —O— moieties and/or which may be substituted by one or more substituents selected from the group consisting of $C_5$-$C_8$-cycloalkyl (which may be substituted by one or more $C_1$-$C_6$-alkyl substituents), phenyl or phenyl-$C_1$-$C_6$-alkyl (which may each be substituted by one or more $C_1$-$C_{18}$-alkyl and/or $C_1$-$C_6$-alkoxy substituents), —OCOR$^1$, —N(R$^1$)$_2$, —SO$_2$NH$_2$, —SO$_2$N(R$^1$)$_2$, —CON(R$^1$)$_2$ and —COOR$^1$;

$C_5$-$C_8$-cycloalkyl whose carbon skeleton may be interrupted by one or more moieties selected from the group consisting of —O—, —S— and —NR$^2$— and/or which may be substituted by one or more $C_1$-$C_6$-alkyl substituents;

phenyl, phenyl-$C_1$-$C_6$-alkyl, naphthyl or hetaryl, which may each be substituted by one or more substituents selected from the group consisting of $C_1$-$C_{18}$-alkyl, $C_1$-$C_6$-alkoxy, phenylazo, naphthylazo, pyridylazo, pyrimidylazo, cyano, —N(R$^1$)$_2$, —CON(R$^1$)$_2$ and —COOR$^1$;

$R^1$ is $C_1$-$C_6$-alkyl, $C_5$-$C_8$-cycloalkyl, phenyl or phenyl-$C_1$-$C_6$-alkyl;

$R^2$ is $C_1$-$C_6$-alkyl, phenyl or phenyl-$C_1$-$C_6$-alkyl, by dimerizing a naphthalene-1,8-dicarboximide of the formula II

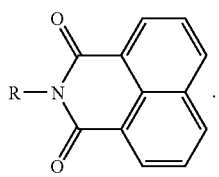

The present invention also relates to the preparation of perylene-3,4:9,10-tetracarboxylic dianhydride by modifying the process for preparing perylene-3,4:9,10-tetracarboxylic diimide.

The present invention further relates to the preparation of the naphthalene-1,8-dicarboximides II which serve as a starting material for these methods of preparation and also to novel naphthalene-1,8-dicarboximides IIb.

Perylene-3,4:9,10-tetracarboxylic diimides (I; hereinafter shortened to "perylimides") have long been used as vat dyes, pigments and fluorescent dyes because of their outstanding performance characteristics (brilliant color, high thermal, chemical and photochemical stability, high fluorescence). The perylimides I are further used for reprographic operations, in electrophotography, in fluorescent solar collectors, in photovoltaics, as laser dyes, as an active component in chemiluminescence applications, in electroluminescent devices and in model systems for molecular switches.

It has long been known that unsubstituted perylimide can be prepared by fusing naphthalene-1,8-dicarboximide (hereinafter shortened to "naphthalimide") with potassium hydroxide or mixtures of potassium hydroxide and sodium hydroxide and subsequent reoxidation of the "leuco form" intermediate (cf. for example EP-A-525 538). The yield of this fusion can be increased by adding sodium acetate (EP-A-54 806) or glycols (U.S. Pat. No. 3,446,810).

Similarly, alkali fusion of N-methyl-, N-ethyl- and N-phenylnaphthalimide gives the corresponding N,N'-disubstituted perylimides (DE-C-276 956), albeit in unsatisfactory yield and only when appreciable apparatus resources are employed to remove undesirable impurities. Further N,N'-disubstituted perylimides, for example those which are substituted by substituted phenyl radicals or functionalized alkyl radicals on the nitrogen atoms, cannot be prepared by this process. In addition, the environmentally and commercially necessary reprocessing of the melts used is very energy intensive and technically inconvenient.

Kawamura Rikagaku Kenkyusho Hokoku 8, pages 85-95 (1996, published 1997) (Chemical Abstracts 127: 264199g) describes the preparation of unsubstituted perylimide by dimerization of naphthalimide in diethylene glycol dimethyl ether in the presence of potassium tert-butoxide and 1,5-diazabicyclo[4.3.0]-5-nonene. According to the reaction mechanism presented there, the simultaneous presence of the sterically hindered bicyclic nitrogen base, of the potassium base and of the chelating solvent is essential and leads to the formation of a complex which allows the perylimide to form.

In the associated JP-A-194 746/1997 and also J. Org. Chem. 2001, 66, pages 94-98, solvents used for preparing unsubstituted perylimide further include heptane, toluene, quinoline and cyclohexylamine. Furthermore, it is stated that even N,N'-dimethyl-, N,N'-dioctyl-, N,N'-dicyclohexyl-, N,N'-diphenyl-, N,N'-bis(p-methoxyphenyl)-, N,N'-bis(p-chlorophenyl)-, N,N'-bis(3,5-dimethylphenyl)-, N,N'-dibenzyl- and N,N'-bis(p-phenylazophenyl)perylimide are obtainable in diethylene glycol dimethyl ether. The yields for these products vary, but only amount to <50% for the majority of the substrates even on using extreme base excesses (27 equivalents of potassium tert-butoxide and 27 equivalents of 1,5-diazabicyclo[4.3.0]-5-nonene).

As well as the low yields, this process has a number of further disadvantages. The purity of the substituted perylimides obtained often leaves something to be desired. Moreover, the bicyclic nitrogen bases which are used in a large excess are very costly, making the process too costly to implement on an industrial scale even with substantial recycling of the bicyclic nitrogen bases, although this recycling can only be accomplished by a costly and inconvenient fractional distillation.

The naphthalimides II which serve as starting materials for the perylimide preparation may be prepared from naphthalene-1,8-dicarboxylic anhydride by various known processes: the reaction with aniline in acetic acid, with tert-butylamine, 1,1-dimethylpropylamine or o-nitroaniline in the absence of a solvent, with primary $C_1$-$C_4$-alkylamines in benzene, toluene, chlorobenzene, pyridine or picoline in the presence of phosphorus trichloride, phosphoryl chloride or thionyl chloride and also with short-chain water-soluble alkylamines in aqueous media (cf. Pol. J. Chem. 55, pages 555-563 (1981), Zh. Org. Khim. 21, pages 2415-2423 (1985), IN 141431).

However, these processes are unsatisfactory in various respects. They give only unsatisfactory yields and/or contaminated products. Moreover, the processes do not have universal utility. Only few primary amines can thus be reacted with naphthalene-1,8-dicarboxylic anhydride; more particularly, sterically strongly hindered or inert aromatic amines cannot be used.

It is an object of the present invention to remedy the defects mentioned and to provide an advantageous access to the perylimides I and the naphthalimides II as precursors to the perylimides I.

We have found that this object is achieved by a process for preparing perylene-3,4:9,10-tetracarboxylic diimides of the general formula I

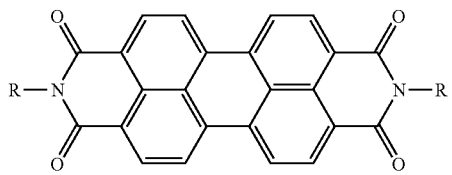

where
R is $C_1$-$C_{30}$-alkyl whose carbon chain may be interrupted by one or more —O— moieties and/or which may be substituted by one or more substituents selected from the group consisting of $C_5$-$C_8$-cycloalkyl (which may be substituted by one or more $C_1$-$C_6$-alkyl substituents), phenyl or phenyl-$C_1$-$C_6$-alkyl (which may each be substituted by one or more $C_1$-$C_{18}$-alkyl and/or $C_1$-$C_6$-alkoxy substituents), —OCOR$^1$, —N(R$^1$)$_2$, —SO$_2$NH$_2$, —SO$_2$N(R$^1$)$_2$, —CON(R$^1$)$_2$ and —COOR$^1$;

$C_5$-$C_8$-cycloalkyl whose carbon skeleton may be interrupted by one or more moieties selected from the group consisting of —O—, —S— and —NR$^2$— and/or which may be substituted by one or more $C_1$-$C_6$-alkyl substituents;

phenyl, phenyl-$C_1$-$C_6$-alkyl, naphthyl or hetaryl, which may each be substituted by one or more substituents selected from the group consisting of $C_1$-$C_{18}$-alkyl, $C_1$-$C_6$-alkoxy, phenylazo, naphthylazo, pyridylazo, pyrimidylazo, cyano, —N(R$^1$)$_2$, —CON(R$^1$)$_2$ and —COOR$^1$;

R$^1$ is $C_1$-$C_6$-alkyl, $C_5$-$C_8$-cycloalkyl, phenyl or phenyl-$C_1$-$C_6$-alkyl;

R$^2$ is $C_1$-$C_6$-alkyl, phenyl or phenyl-$C_1$-$C_6$-alkyl, by dimerizing a naphthalene-1,8-dicarboximide of the formula II

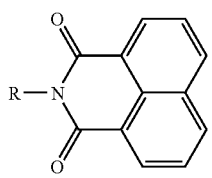

which comprises effecting said dimerizing in a reaction medium consisting essentially of an apolar aprotic organic solvent and an alkali metal base and subsequently reoxidizing the resulting alkali metal salt of the leuco form of the perylene-3,4:9,10-tetracarboxylic diimide in the presence of a polar solvent.

The present invention further provides a process for preparing perylene-3,4:9,10-tetracarboxylic dianhydride, which comprises dimerizing a naphthalene-1,8-dicarboximide of the formula IIa

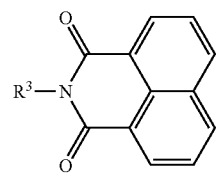

where R$^3$ is cyclohexyl or phenyl which may each be substituted by up to three $C_1$-$C_4$-alkyl radicals, in a reaction medium consisting essentially of an apolar aprotic organic solvent and an alkali metal base and effecting the subsequent reoxidation of the resulting alkali metal salt of the leuco form of the perylene-3,4:9,10-tetracarboxylic diimide of the formula Ia

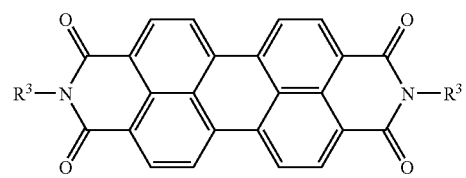

in the presence of an inert organic solvent, of an alkali metal base and of water to hydrolyze the diimide to the tetraalkali-metal salt of perylene-3,4:9,10-tetracarboxylic acid and finally subjecting this to the action of an aqueous inorganic acid to convert it into perylene-3,4:9,10-tetracarboxylic dianhydride.

The present invention further provides a process for preparing naphthalene-1,8-dicarboximides of the general formula II

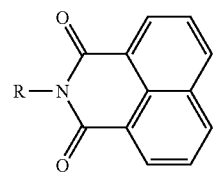

by reacting naphthalene-1,8-dicarboxylic anhydride with a primary amine of the general formula III

R—NH$_2$        III which comprises effecting said reacting in the presence of a polar aprotic organic solvent and also of an organic or inorganic acid or of an acidic transition metal salt catalyst or in the presence of phenol.

Lastly, the present invention provides the naphthalene-1,8-dicarboximides of the general formula IIb

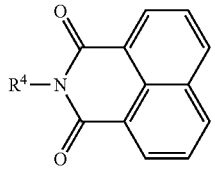

where:
R$^4$ is C$_1$-C$_{30}$-alkyl which is substituted by one or more substituents selected from the group consisting of C$_5$-C$_8$-cycloalkyl (which may be substituted by one or more C$_1$-C$_6$-alkyl substituents), phenyl or phenyl-C$_1$-C$_6$-alkyl (which may each be substituted by one or more C$_1$-C$_{18}$-alkyl and/or C$_1$-C$_6$-alkoxy substituents), —OCOR$^1$, —N(R$^1$)$_2$, —SO$_2$NH$_2$, —SO$_2$N(R$^1$)$_2$, —CON(R$^1$)$_2$ and —COOR$^1$ and whose carbon chain may be interrupted by one or more —O— moieties;

C$_5$-C$_8$-cycloalkyl whose carbon skeleton is interrupted by one or more moieties selected from the group consisting of —O—, —S— and —NR$^2$— and/or is substituted by one or more C$_1$-C$_6$-alkyl substituents;

phenyl or phenyl-C$_1$-C$_6$-alkyl which are each substituted by one or more substituents selected from the group consisting of C$_1$-C$_{11}$-alkyl, C$_1$-C$_6$-alkoxy, phenylazo, naphthylazo, pyridylazo, pyrimidylazo, cyano, —N(R$^1$)$_2$, —CON(R$^1$)$_2$ and —COOR$^1$;

naphthyl or hetaryl which may each be substituted by one or more substituents selected from the group consisting of C$_1$-C$_{18}$-alkyl, C$_1$-C$_6$-alkoxy, phenylazo, naphthylazo, pyridylazo, pyrimidylazo, cyano, —N(R$^1$)$_2$, —CON(R$^1$)$_2$ and —COOR$^1$;

R$^1$ is C$_1$-C$_6$-alkyl, C$_5$-C$_8$-cycloalkyl, phenyl or phenyl-C$_1$-C$_6$-alkyl;

R$^2$ is C$_1$-C$_6$-alkyl, phenyl or phenyl-C$_1$-C$_6$-alkyl.

Any alkyl appearing in the formulae I to III may be straight-chain or branched. Substituted aromatic radicals may generally bear up to 3, preferably 1 or 2, of the substituents mentioned.

Specific examples of suitable R, R$^1$, R$^2$, R$^3$ and R$^4$ (and also their substituents) are:

methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above designations isooctyl, isononyl, isodecyl and isotridecyl are trivial names derived from the alcohols obtained in the oxo process);

methoxy, ethoxy, propoxy, isopropoxy, butoxy, isobutoxy, sec-butoxy, tert-butoxy, pentoxy, isopentoxy, neopentoxy, tert-pentoxy and hexoxy;

N,N-dimethylamino, N,N-diethylamino, N,N-dipropylamino, N,N-diisopropylamino, N,N-dibutylamino, N,N-diisobutylamino, N,N-dipentylamino, N,N-dihexylamino, N,N-dicyclopentylamino, N,N-dicyclohexylamino, N,N-dicycloheptylamino, N,N-diphenylamino and N,N-dibenzylamino;

methoxymethyl, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxamidecyl and 3,6,9,12-tetraoxatetradecyl;

2-formyloxyethyl, 2- and 3-formyloxypropyl, 2-, 3- and 4-formyloxybutyl, 2-, 3-, 4-, 5- and 6-formyloxyhexyl, 2-, 3-, 4-, 5-, 6-, 7- and 8-formyloxyoctyl, 2-acetoxyethyl, 2- and 3-acetoxypropyl, 2-, 3- and 4-acetoxybutyl, 2-, 3-, 4-, 5- and 6-acetoxyhexyl, 2-, 3-, 4-, 5-, 6-, 7- and 8-acetoxyoctyl, 2-propionyloxyethyl, 2- and 3-propionyloxypropyl, 2-, 3- and 4-propionyloxybutyl, 2-, 3-, 4-, 5- and 6-propionyloxyhexyl, 2-, 3-, 4-, 5-, 6-, 7- and 8-propionyloxyoctyl, 2-benzoyloxyethyl, 2- and 3-benzoyloxypropyl, 2-, 3- and 4-benzoyloxybutyl, 2-, 3-, 4-, 5- and 6-benzoyloxyhexyl and 2-, 3-, 4-, 5-, 6-, 7- and 8-benzoyloxyoctyl;

2-(N,N-dimethyl-, N,N-diethyl-, N,N-dibutyl- and N,N-diphenylamino)ethyl, 3-(N,N-dimethyl-, N,N-diethyl-, N,N-dibutyl- and N,N-diphenylamino)propyl, 4-(N,N-dimethyl-, N,N-diethyl-, N,N-dibutyl- and N,N-diphenylamino)butyl, 6-(N,N-dimethyl-, N,N-diethyl-, N,N-dibutyl- and N,N-diphenylamino)hexyl, 8-(N,N-dimethyl-, N,N-diethyl-, N,N-dibutyl- and N,N-diphenylamino)octyl and 12-(N,N-dimethyl-, N,N-diethyl-, N,N-dibutyl- and N,N-diphenylamino)dodecyl;

sulfamidomethyl, 2-sulfamidoethyl, 3-sulfamidopropyl, 4-sulfamidobutyl, 5-sulfamidopentyl, 6-sulfamidohexyl, 8-sulfamidooctyl, 10-sulfamidodecyl, 12-sulfamidododecyl and 18-sulfamidooctadecyl;

N,N-dimethyl-, N,N-diethyl-, N,N-dibutyl- and N,N-diphenylsulfamidomethyl, 2-(N,N-dimethyl-, N,N-diethyl-, N,N-dibutyl- and N,N-diphenylsulfamido)ethyl, 3-(N,N-dimethyl-, N,N-diethyl-, N,N-dibutyl- and N,N-diphenylsulfamido)propyl, 4-(N,N-dimethyl-, N,N-diethyl-, N,N-dibutyl- and N,N-diphenylsulfamido)butyl, 5-(N,N-dimethyl-, N,N-diethyl-, N,N-dibutyl- and N,N-diphenylsulfamido)pentyl, 6-(N,N-dimethyl-, N,N-diethyl-, N,N-dibutyl- and N,N-diphenylsulfamido)hexyl, 8-(N,N-dimethyl-, N,N-diethyl-, N,N-dibutyl- and N,N-diphenylsulfamido)octyl, 10-(N,N-dimethyl-, N,N-diethyl-, N,N-dibutyl- and N,N-diphenylsulfamido)decyl, 12-(N,N-dimethyl-, N,N-diethyl-, N,N-dibutyl- and N,N-diphenylsulfamido)dodecyl and 18-(N,N-dimethyl-, N,N-diethyl-, N,N-dibutyl- and N,N-diphenylsulfamido)octadecyl;

N,N-dimethyl-, N,N-diethyl-, N,N-dibutyl- and N,N-diphenylcarboxamidomethyl, 2-(N,N-dimethyl-, N,N-diethyl-, N,N-dibutyl- and N,N-diphenylcarboxamido)ethyl, 3-(N,N-dimethyl-, N,N-diethyl-, N,N-dibutyl- and N,N-diphenylcarboxamido)propyl, 4-(N,N-dimethyl-, N,N-diethyl-, N,N-dibutyl- and N,N-diphenylcarboxamido)butyl, 5-(N,N-dimethyl-, N,N-diethyl-, N,N-dibutyl- and N,N-diphenylcarboxamido)pentyl, 6-(N,N-dimethyl-, N,N-diethyl-, N,N-dibutyl- and N,N-diphenylcarboxamido)hexyl, 8-(N,N-dimethyl-, N,N-diethyl-, N,N-dibutyl- and N,N-diphenylcarboxamido)octyl, 10-(N,N-dimethyl-, N,N-diethyl-, N,N-dibutyl- and N,N-diphenylcarboxamido)decyl, 12-(N,N-dimethyl-, N,N-diethyl-, N,N-dibutyl- and N,N-diphenylcarboxamido)dodecyl and 18-(N,N-dimethyl-, N,N-diethyl-, N,N-dibutyl- and N,N-diphenylcarboxamido)octadecyl;

methyl-, ethyl-, propyl-, butyl-, pentyl- and hexylcarboxymethyl, methyl-, ethyl-, propyl-, butyl-, pentyl- and hexyl-2-carboxyethyl, methyl-, ethyl-, propyl-, butyl-, pentyl- and hexyl-3-carboxypropyl, methyl-4-carboxybutyl, methyl- 5-carboxypentyl, methyl-6-carboxyhexyl, methyl-8-carboxyoctyl, methyl-10-carboxydecyl, methyl-12-carboxydodecyl and methyl-14-carboxytetradecyl;

cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 1,3-dioxan-2-yl, 1,4-dioxan-2-yl, n-methyl-, n-ethyl-, n-propyl-, n-butyl-, n-phenyl- and n-benzyl-2-morpholinyl, n-methyl-, n-ethyl-, n-propyl-, n-butyl-, n-phenyl- and n-benzyl-3-morpholinyl, 2- and 3-tetrahydrofuryl, 2- and 3-tetrahydrothienyl, 1-, 2- and 3-pyrrolidinyl and 1-, 2-, 3- and 4-piperidyl;

phenyl, 1- and 2-naphthyl, 2- and 3-pyrryl, 2-, 3- and 4-pyridyl, 2-, 4- and 5-pyrimidyl, 3-, 4- and 5-pyrazolyl, 2-, 4- and 5-imidazolyl, 2-, 4- and 5-thiazolyl, 3-(1,2,4-triazyl), 2-(1,3,5-triazyl), 6-quinaldyl, 3-, 5-, 6- and 8-quinolinyl, 2-benzoxazolyl, 2-benzothiazolyl, 5-benzothiadiazolyl, 2- and 5-benzimidazolyl and 1- and 5-isoquinolyl;

2-, 3- and 4-methylphenyl, 2,3-, 2,4-, 2,5-, 3,5- and 2,6-dimethylphenyl, 2,4,6-, 2,3,4- and 2,3,5-trimethylphenyl, 2-, 3- and 4-ethylphenyl, 2,3-, 2,4-, 2,5-, 3,5- and 2,6-diethylphenyl, 2,4,6-, 2,3,4- and 2,3,5-triethylphenyl, 2-, 3- and 4-propylphenyl, 2,3-, 2,4-, 2,5-, 3,5- and 2,6-dipropylphenyl, 2,4,6-, 2,3,4- and 2,3,5-tripropylphenyl, 2-, 3- and 4-isopropylphenyl, 2,3-, 2,4-, 2,5-, 3,5- and 2,6-diisopropylphenyl, 2,4,6-, 2,3,4- and 2,3,5-triisopropylphenyl, 2-, 3- and 4-butylphenyl, 2,3-, 2,4-, 2,5-, 3,5- and 2,6-dibutylphenyl, 2,4,6-, 2,3,4- and 2,3,5-tributylphenyl, 2-, 3- and 4-isobutylphenyl, 2,3-, 2,4-, 2,5-, 3,5- and 2,6-diisobutylphenyl, 2,4,6-, 2,3,4- and 2,3,5-triisobutylphenyl, 2-, 3- and 4-tert-butylphenyl, 2,4-, 2,5-, 3,5- and 2,6-di-tert-butylphenyl; 2-, 3- and 4-methoxyphenyl, 2,3-, 2,4-, 2,5-, 3,5- and 2,6-dimethoxyphenyl, 2,4,6-, 2,3,4- and 2,3,5-trimethoxyphenyl, 2-, 3- and 4-ethoxyphenyl, 2,3-, 2,4-, 2,5-, 3,5- and 2,6-diethoxyphenyl, 2,4,6-, 2,3,4- and 2,3,5-triethoxyphenyl, 2-, 3- and 4-propoxyphenyl, 2,3-, 2,4-, 2,5-, 3,5- and 2,6-dipropoxyphenyl, 2,4,6-, 2,3,4- and 2,3,5-tripropoxyphenyl, 2-, 3- and 4-isopropoxyphenyl, 2,3-, 2,4-, 2,5-, 3,5- and 2,6-diisopropoxyphenyl and 2,4,6-, 2,3,4- and 2,3,5-triisopropoxyphenyl;

4-phenylazophenyl, 4-(1-naphthylazo)phenyl, 4-(2-naphthylazo)phenyl, 4-(2-pyridylazo)phenyl, 4-(3-pyridylazo)phenyl, 4-(4-pyridylazo)phenyl, 4-(2-pyrimidylazo)phenyl, 4-(4-pyrimidylazo)phenyl and 4-(5-pyrimidylazo)phenyl;

benzyl, phenylethyl, phenylpropyl, phenylbutyl, phenylpentyl, phenylhexyl, 2-, 3- and 4-methylbenzyl, 2-, 3- and 4-ethylbenzyl, 2-, 3- and 4-butylbenzyl, 2,3-, 2,4-, 2,5-, 3,5- and 2,6-dimethylbenzyl, 2,3-, 2,4-, 2,5-, 3,5- and 2,6-diethylbenzyl, 2-, 3- and 4-methoxybenzyl, 2-, 3- and 4-ethoxybenzyl, 2-, 3- and 4-butoxybenzyl, 2,3-, 2,4-, 2,5-, 3,5- and 2,6-dimethoxybenzyl, 2,3-, 2,4-, 2,5-, 3,5- and 2,6-diethoxybenzyl, 4-phenylazobenzyl, β-(2-, 3- and 4-methylphenyl)ethyl, β-(2-, 3- and 4-ethylphenyl)ethyl, β-(2-, 3- and 4-butylphenyl)ethyl, β-(2,3-, 2,4-, 2,5-, 3,5- and 2,6-dimethylphenyl)ethyl, β-(2,3-, 2,4-, 2,5-, 3,5- and 2,6-diethylphenyl)ethyl, β-(2-, 3- and 4-methoxyphenyl)ethyl, β-(2-, 3- and 4-ethoxyphenyl)ethyl, β-(2-, 3- and 4-butoxyphenyl)ethyl, β-(2,3-, 2,4-, 2,5-, 3,5- and 2,6-dimethoxyphenyl)ethyl, β-(2,3-, 2,4-, 2,5-, 3,5- and 2,6-diethoxyphenyl)ethyl and β-(4-phenylazophenyl)ethyl;

3- and 4-(N,N-dimethylamino)phenyl, 3- and 4-(N,N-diethylamino)phenyl, 3- and 4-(N,N-dibutylamino)phenyl, 4-(N,N-diphenylamino)phenyl, 3,5-bis(N,N-dimethylamino)phenyl, 3,5-bis(N,N-diethylamino)phenyl, 3,5-bis(N,N-dibutylamino)phenyl, 3,5-bis(N,N-diphenylamino)phenyl, 3- and 4-(N,N-dimethylamino)benzyl, 3- and 4-(N,N-diethylamino)benzyl, 3- and 4-(N,N-dibutylamino)benzyl, 3- and 4-(N,N-diphenylamino)benzyl, 3,5-bis(N,N-dimethylamino)benzyl, 3,5-bis(N,N-diethylamino)benzyl, 3,5-bis(N,N-dibutylamino)benzyl, 3,5-bis(N,N-diphenylamino)benzyl, β-[3- and 4-(N,N-dimethylamino)phenyl]ethyl, β-[3- and 4-(N,N-diethylamino)phenyl]ethyl, β-[3- and 4-(N,N-dibutylamino)phenyl]ethyl, β-[4-(N,N-diphenylamino)phenyl]ethyl, β-[3,5-bis(N,N-dimethylamino)phenyl]ethyl, β-[3,5-bis(N,N-diethylamino)phenyl]ethyl, β-[3,5-bis(N,N-dibutylamino)phenyl]ethyl, β-[3,5-bis(N,N-diphenylamino)phenyl]ethyl, 4-(N,N-dimethylamino)naphth-1-yl, 4-(N,N-diethylamino)naphth-1-yl, 4-(N,N-dibutylamino)naphth-1-yl, 4-(N,N-diphenylamino)naphth-1-yl, 5-(N,N-dimethylamino)naphth-1-yl, 5-(N,N-diethylamino)naphth-1-yl, 5-(N,N-dibutylamino)naphth-1-yl, 5-(N,N-diphenylamino)naphth-1-yl, 6-(N,N-dimethylamino)naphth-2-yl, 6-(N,N-diethylamino)naphth-2-yl, 6-(N,N-dibutylamino)naphth-2-yl and 6-(N,N-diphenylamino)naphth-2-yl;

3- and 4-(N,N-dimethylcarboxamido)phenyl, 3- and 4-(N,N-diethylcarboxamido)phenyl, 3- and 4-(N,N-dibutylcarboxamido)phenyl, 4-(N,N-diphenylcarboxamido)phenyl, 3,5-bis(N,N-dimethylcarboxamido) phenyl, 3,5-bis(N,N-diethylcarboxamido)phenyl, 3,5-bis(N,N-dibutylcarboxamido)phenyl, 3,5-bis(N,N-diphenylcarboxamido)phenyl, 3- and 4-(N,N-dimethylcarboxamido)benzyl, 3- and 4-(N,N-diethylcarboxamido)benzyl, 3- and 4-(N,N-dibutylcarboxamido)benzyl, 4-(N,N-diphenylcarboxamido)benzyl, 3,5-bis(N,N-dimethylcarboxamido)benzyl, 3,5-bis(N,N-diethylcarboxamido)benzyl, 3,5-bis(N,N-dibutylcarboxamido)benzyl, 3,5-bis(N,N-diphenylcarboxamido)benzyl, β-[3- and 4-(N,N-dimethylcarboxamido)phenyl]ethyl, β-[3- and 4-(N,N-diethylcarboxamido)phenyl]ethyl, β-[3- and 4-(N,N-dibutylcarboxamido)phenyl]ethyl, β-[4-(N,N-diphenylcarboxamido)phenyl]ethyl, β-[3,5-bis(N,N-dimethylcarboxamido)phenyl]ethyl, β-[3,5-bis(N,N-diethylcarboxamido)phenyl]ethyl, β-[3,5-bis(N,N-dibutylcarboxamido)phenyl]ethyl and β-[3,5-bis(N,N-diphenylcarboxamido)phenyl]ethyl;

2-, 3- and 4-(carboxymethyl)phenyl, 2-, 3- and 4-(carboxyethyl)phenyl, 2-, 3- and 4-(carboxybutyl)phenyl, 3- and 4-(carboxyphenyl)phenyl, 2,4-, 2,5- and 3,5-bis(carboxymethyl)phenyl, 2,4-, 2,5- and 3,5-bis(carboxyethyl)phenyl, 2,4-, 2,5- and 3,5-bis(carboxybutyl)phenyl, 3,5-bis(carboxyphenyl)phenyl, 2-, 3- and 4-(carboxymethyl)benzyl, 2-, 3- and 4-(carboxyethyl)benzyl, 2-, 3- and 4-(carboxybutyl)benzyl, 3- and 4-(carboxyphenyl)benzyl, 2,4-, 2,5- and 3,5-bis(carboxymethyl)benzyl, 2,4-, 2,5- and 3,5-bis(carboxyethyl)benzyl, 2,4-, 2,5- and 3,5-bis (carboxybutyl)benzyl, 3,5-bis(carboxyphenyl)benzyl, β-[2-, 3- and 4-(carboxymethyl)phenyl]ethyl, β-[2-, 3- and 4-(carboxyethyl)phenyl]ethyl, β-[2-, 3- and 4-(carboxybutyl)phenyl]ethyl, β-[3- and 4-(carboxyphenyl)phenyl]ethyl, β-[2,4-2,5- and 3,5-bis(carboxymethyl)phenyl]ethyl, β-[2,4-, 2,5- and 3,5-bis(carboxyethyl)phenyl]ethyl, β-[2,4-, 2,5- and 3,5-bis(carboxybutyl)phenyl]ethyl, β-[3,5-bis(carboxyphenyl)phenyl]ethyl, 2-, 4- and 5-(carboxymethyl)naphth-1-yl, 2-, 4- and 5-(carboxyethyl)

naphth-1-yl, 2-, 4- and 5-(carboxybutyl)naphth-1-yl, 2-, 4- and 5-(carboxyphenyl)naphth-1-yl, 4-, 5-, 6-, 7- and 8-(carboxymethyl)naphth-2-yl, 4-, 5-, 6-, 7- and 8-(carboxyethyl)naphth-2-yl, 4-, 5-, 6-, 7- and 8-(carboxybutyl)naphth-2-yl and 4-, 5-, 6-, 7- and 8-(carboxyphenyl)naphth-2-yl.

The novel process for preparing the perylimides I comprises (step a) the appropriately substituted naphthalimides II being dimerized in the presence of an apolar aprotic organic solvent and of an alkali metal base and (step b) the resulting alkali metal salt of the leuco form of the perylimide I "vat salt" being subsequently reoxidized in the presence of a polar solvent.

Useful solvents for step a) include in principle all apolar aprotic solvents which are stable to bases under the reaction conditions and have a boiling point above the reaction temperature chosen and in which the naphthalimides II are completely soluble at reaction temperature and the bases used at least partially soluble, so that substantially homogeneous reaction conditions are present.

Examples of preferred solvents are solvents which boil at >100° C. and come from the following groups: aliphatics (especially $C_8$-$C_{18}$-alkanes), unsubstituted, alkyl-substituted and fused cycloaliphatics (especially unsubstituted $C_7$-$C_{10}$-cycloalkanes, $C_6$-$C_8$-cycloalkanes which are substituted by from one to three $C_1$-$C_6$-alkyl groups, polycyclic saturated hydrocarbons having from 10 to 18 carbon atoms), alkyl- and cycloalkyl-substituted aromatics (especially benzene which is substituted by from one to three $C_1$-$C_6$-alkyl groups or a $C_5$-$C_8$-cycloalkyl radical) and fused aromatics which may be alkyl substituted and/or partially hydrogenated (especially naphthalene which is substituted by from one to four $C_1$-$C_6$-alkyl groups) and also mixtures thereof.

Specific examples of particularly preferred solvents are: octane, isooctane, nonane, isononane, decane, isodecane, undecane, dodecane, hexadecane and octadecane; cycloheptane, cyclooctane, methylcyclohexane, dimethylcyclohexane, trimethylcyclohexane, ethylcyclohexane, diethylcyclohexane, propylcyclohexane, isopropylcyclohexane, dipropylcyclohexane, butylcyclohexane, tert-butylcyclohexane, methylcycloheptane and methylcyclooctane; toluene, o-, m- and p-xylene, 1,3,5-trimethylbenzene (mesitylene), 1,2,4- and 1,2,3-trimethylbenzene, ethylbenzene, propylbenzene, isopropylbenzene, butylbenzene, isobutylbenzene, tert-butylbenzene and cyclohexylbenzene; naphthalene, decahydronaphthalene (decalin), 1- and 2-methylnaphthalene, 1- and 2-ethylnaphthalene; combinations of the aforementioned solvents that are obtainable from the high-boiling, partially or fully hydrogenated fractions of thermal and catalytic cracking operations in petroleum or naphtha processing, eg mixtures of the Exxsol® type, and alkylbenzene mixtures of the Solvesso® type.

Very particularly preferred solvents are isopropylcyclohexane, dimethylcyclohexane (all isomers), trimethylcyclohexane (all isomers), decalin, xylene (all isomers) and mesitylene.

Useful bases for step a) include strong inorganic and organic alkali metal bases having a low nucleophilic effect. Preferred inorganic bases are alkali metal hydroxides and amides, while preferred organic bases are alkali metal alkoxides (especially $C_1$-$C_5$-alkoxides), alkali metal(phenyl)alkylamides (especially the bis($C_1$-$C_4$-alkyl)amides) and triphenylmethyl metallates. Preferred alkali metals are lithium, sodium and potassium, and potassium is particularly preferred.

Specific examples of particularly preferred bases are: lithium hydroxide, sodium hydroxide and potassium hydroxide; lithium amide, sodium amide and potassium amide; lithium methoxide, sodium methoxide, potassium methoxide, lithium ethoxide, sodium ethoxide, potassium ethoxide, sodium isopropoxide, potassium isopropoxide, sodium tert-butoxide and potassium tert-butoxide; lithium dimethylamide, lithium diethylamide, lithium diisopropylamide, sodium diisopropylamide, triphenylmethyllithium, triphenylmethylsodium and triphenylmethylpotassium.

Very particularly preferred bases are lithium diisopropylamide, sodium methoxide, sodium tert-butoxide and especially potassium tert-butoxide, potassium methoxide and potassium hydroxide.

When the methoxides and hydroxides are used, it is advisable to enhance the reactivity by adding small amounts of a nitrogenous heterocycle phase mediator having 5 or 6 ring atoms such as pyridine, N-methylpiperidine, N-methylpiperidone, N-methylmorpholine or, in particular, N-methyl-2-pyrrolidone. Suitable use levels are generally in the range from 5 to 20% by weight, based on the naphthalimide II.

The alkali metal base is generally used in an amount of from 1.8 to 8 molar equivalents and preferably from 1.8 to 2.5 molar equivalents in the case of the organic bases and from 2 to 5 molar equivalents in the case of the inorganic bases, based on the naphthalimide II.

The alkali metal base can be used in solid form or in dissolved form. When the alkali metal base is not sufficiently soluble in the apolar aprotic reaction solvent, it may be dissolved in an alcohol which has a higher base strength than the alkali metal base. Suitable are especially tertiary aliphatic alcohols which may contain aryl substituents and which have in total from 4 to 12 carbon atoms, eg tert-butanol, 2-methyl-2-butanol (tert-amyl alcohol), 3-methyl-3-pentanol, 3-ethyl-3-pentanol, 2-phenyl-2-pentanol, 2,3-dimethyl-3-pentanol, 2,4,4-trimethyl-2-pentanol and 2,2,3,4,4-pentamethyl-3-pentanol.

The solvent quantity in step a) is determined by the mode of reaction management. As explicated hereinbelow, both a discontinuous and a quasicontinuous mode are possible.

In the discontinuous batch mode, at least the naphthalimide II has to be in the state of complete solution at the reaction temperature. Therefore, it is customary to use from 5 to 50 kg and preferably from 7 to 25 kg of solvent per kg of II. When the alkali metal base is added as a solution, it is generally necessary to employ an additional from 3 to 10 kg of solvent per kg of base. When the alkali metal base is used as a solid, there is generally no need for further solvent.

In the quasicontinuous mode, not only the naphthalimide II but also the alkali metal base have to be in a state of complete solution at the reaction temperature. The total amount of solvent required therefore generally increases to 8-100 kg and preferably 10-50 kg. In this total, the amount needed for the naphthalimide II remains the same, while the base generally requires from 3 to 50 kg and preferably from 3 to 25 kg of solvent per kg of base.

The reaction temperature in step a) is customarily in the range from 80 to 250° C., the preferred reaction temperatures being determined by the reactivity and solubility of the naphthalimides II used. Thus, the highly reactive N-alkyl-substituted naphthalimides II prefer a temperature in the range from 80 to 150° C. and especially in the range from 100 to 130° C. In the case of the readily soluble, base-stable N-aryl-substituted naphthalimides II of medium reactivity, the reaction temperature is preferably in the range from 130 to 200° C. and especially in the range from 150 to 180° C., while a reaction temperature of from 170 to 250° C., and preferably of from 180 to 210° C. is particularly suitable for sparingly soluble, base-labile or inert naphthalimides II. Since the reaction times are dramatically shortened compared with existing methods of preparation, distinctly reduced decomposition is observed even in the case of the base-labile naphthalimides II, despite the high reaction temperatures.

Thus, the reaction time is generally in the range from 0.1 to 10 h and preferably from 0.2 to 6 h or from 0.1 to 1 h in the case of base-labile naphthalimides II in the discontinuous mode and generally from 5 to 1200 sec and preferably from 5 to 300 sec in the case of the quasicontinuous mode.

The dimerization is customarily carried out in the discontinuous mode under atmospheric pressure. If the reaction temperature is to be above the boiling point of the solvent, it is of course also possible to conduct the reaction in a contained system under the developing autogenous pressure or under pressure control. A quasicontinuous dimerization is customarily carried out under a pressure of about 1-50 bar.

An advantageous procedure for step a) of the novel process for preparing the perylimides I is as follows:

In the discontinuous mode, naphthalimide II and, if used, the nitrogenous reaction mediator are dissolved in the solvent by heating, the solution is heated to the desired reaction temperature under nitrogen with stirring, then the alkali metal base is added a little at a time (as a solid) over about 5-60 min or continuously (as a solution) over 0.2-6 h and the mixture is subsequently stirred at the reaction temperature for a further 2-60 min. After cooling to 20-80° C., the precipitated product is filtered off under nitrogen and after a brief wash it is then either immediately used moist in the step b) for reoxidation or the vat salt is extracted with a suitable polar solvent, such as water, methanol, ethanol or glacial acetic acid, from the filter cake under inert conditions and the extraction solution obtained is used in step b). The last procedure is preferable for the reaction of aryl-substituted naphthalimides II, since the corresponding vat salts are in principle obtained as crystalline 1:2 adducts with unconverted naphthalimide which are insoluble in the reaction medium and it is thus possible to avoid a costly and inconvenient final purification of the perylimides I formed.

In the quasicontinuous mode, oxygen-free solutions of naphthalimide II and alkali metal base in the same solvent which have been heated to the reaction temperature are combined at a pressure of about 1-50 bar in a mixing chamber reactor or in a tubular reactor, the rates of addition of the two solvents being chosen so as to give reactor residence times of about 5-1200 sec. The reaction mixture emerging from the reactor is then rapidly cooled down to 20-80° C. and the precipitated reaction product is worked up as described for the discontinuous mode.

The reoxidation of the perylimide I which is present as a vat salt (step b) of the process according to the invention) is effected in the presence of a polar solvent.

Useful polar solvents for this purpose include all polar solvents in which the vat salt is soluble and the perylimide I formed is stable.

Suitable examples include polar protic inorganic solvents such as water and dilute aqueous solutions of inorganic acids and also polar protic organic solvents such as alcohols, especially $C_1$-$C_6$-alkanols, and organic acids, especially aliphatic mono- and dicarboxylic acids having from one to six carbon atoms.

The reoxidation can also be carried out in polar aprotic organic solvents, for example heterocyclic nitrogen bases. In this case, the perylimides I formed can be isolated by precipitating them by addition of protic solvents such as methanol.

It will be appreciated that mixtures of the solvents mentioned can be used as well.

Specific instances of preferred solvents are: water; about 5% by weight hydrochloric acid; methanol, ethanol, propanol, isopropanol, butanol and hexanol; formic acid, acetic acid, propionic acid, butyric acid and adipic acid; N-methyl-2-pyrrolidone.

The presence of an acid is advisable especially in the case of the reoxidation of hydrolysis-prone, base-labile perylimides I. When the solvent used is not the acid itself, it is customary to add sufficient acid to the reaction mixture for the pH to be in the range from 2 to 7.

The amount of solvent is as such uncritical. It is normal to use from 10 to 80 kg of solvent per kg of naphthalimide II originally used.

The oxidizing agent used is preferably oxygen (air) or an aqueous, especially about 5-30% by weight hydrogen peroxide solution in a slight excess.

The reaction temperature is customarily in the range from 20 to 100° C., and preferably in the range from 30 to 80° C.

The reaction time depends on the reaction temperature and is generally in the range from 1 to 16 h. The oxidation normally takes from 1 to 3 h at 60-65° C. and about 4-10 h at 30-40° C.

An advantageous procedure for step b) of the inventive process for preparing the perylimides I is as follows:

The vat salt obtained in step a) either is introduced into the solvent in the form of the moist filter presscake with stirring or dissolved, as described above, directly off the filter by means of the solvent, if necessary adjusted to a neutral to acidic pH as described above, heated to the desired reaction temperature and air is introduced at this temperature or hydrogen peroxide solution is added for complete oxidation (discernible from a change in color from blackish violet to reddish orange or red, depending on the perylimide I prepared). The precipitated end product is then filtered off, thoroughly washed with the solvent used or water and dried. If necessary, the washed product can be subjected to an additional treatment to remove unconverted naphthalimide by refluxing the washed product with from 5 to 10 times the amount of glacial acetic acid with stirring for from 2 to 8 h followed by hot filtration, washing neutral with methanol or water and then drying.

The process of the invention provides the perylimides I in high yields (customarily >75%, based on the conversion; in the case of alkyl- and cycloalkyl-substituted naphthalimides II, the conversion is virtually quantitative, in the case of aryl-substituted naphthalimides II the conversion is in principle not more than 50% owing to the above-discussed adduct formation of the vat salt intermediate with unconverted naphthalimide) in a simple, economical manner. It provides even the perylimides which were not accessible via dimerization of the corresponding naphthalimides (for example perylimides bearing sterically strongly hindered substituents such as 2,6-diisopropylphenyl, 2,5- or 2,6-di-tert-butylphenyl on the imide nitrogen atoms) without problems.

The chemical purity of the perylimides I prepared according to the invention is generally >90% already. If desired for certain applications, their purity can be increased to >98% by further purifying operations customary for such compounds such as recrystallization from halogenated hydrocarbons and also halo- or nitroaromatics, extraction with polar aprotic organic solvents such as isobutyl methyl ketone or treatment with a reducing agent such as sodium dithionite under aqueous alkaline conditions with subsequent reoxidation of the resulting vat salts with oxygen with moderate yield losses (about 10-20%). The very pure perylimides I thus obtained are notable for particular physical properties, for example pronounced solid-state fluorescence, and hence are suitable for specific applications, for example as electroluminescence materials and as charge generation and/or charge transportation compounds. The perylimides prepared by conventional processes do not have these properties, since the processes are such that they are always contaminated by colored, fluorescence-extinguishing perylene derivatives which are not removable even by costly and inconvenient purification processes.

As mentioned, modifying the reoxidation of the vat salt (step b) of the novel process for preparing the perylimides I) provides an advantageous way of obtaining perylene-3,4:9,10-tetracarboxylic dianhydride as well.

In this process of preparation, which likewise forms part of the subject matter of the present invention, the naphthalimides (IIa) used in step a), which is carried out in similar fashion, are preferably substituted on the imide nitrogen by the radicals $R^3$ (cyclohexyl or phenyl which may each be unsubstituted or substituted by up to three $C_1$-$C_4$-alkyl radicals, such as 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, phenyl, 3- and 4-methylphenyl, 2,3-, 2,4-, 2,5- and 3,5-dimethylphenyl, 2,3,4- and 2,3,5-trimethylphenyl, 3- and 4-ethylphenyl, 3,5-diethylphenyl, 3- and 4-propylphenyl, 3,5-dipropylphenyl, 3- and 4-isopropylphenyl, 3,5-diisopropylphenyl, 3- and 4-butylphenyl and 3,5-dibutylphenyl).

In step b) of the novel process for preparing perylene-3,4:9,10-tetracarboxylic dianhydride, which step b) is carried out in the presence of an inert solvent, of a base and of water, the reoxidation is coupled with a hydrolysis.

Useful solvents for this purpose include all solvents which are base stable and in which the vat salt is at least partially soluble.

Suitable are for example polar protic solvents such as aliphatic alcohols, especially $C_3$-$C_6$-alkanols, and base-stable apolar aprotic solvents, especially aromatics such as alkyl-substituted benzenes and fused cycloalkanes, the alcohols being preferred. It will be appreciated that mixtures of these solvents can be used as well.

Specific examples of preferred solvents include:
propanol, isopropanol, butanol, sec-butanol, tert-butanol, pentanol, 2-methyl-2-butanol, 3-methyl-3-pentanol and hexanol; toluene, o-, m- and p-xylene and 1,3,5-, 1,2,4- and 1,2,3-trimethylbenzene.

The amount of solvent is as such uncritical. It is normal to use from 10 to 80 kg of solvent per kg of naphthalimide IIa originally used.

Useful bases include inorganic and organic alkali metal bases. Preferred inorganic bases include alkali metal hydroxides, while preferred organic bases include alkali metal alkoxides (especially $C_1$-$C_4$-alkoxides). Preferred alkali metals include lithium, sodium and potassium, and potassium is particularly preferred. It will be appreciated that mixtures of these bases can be used as well.

Specific examples of particularly preferred bases are: lithium hydroxide, sodium hydroxide and potassium hydroxide; lithium methoxide, sodium methoxide, potassium methoxide, lithium ethoxide, sodium ethoxide, potassium ethoxide, sodium propoxide, potassium propoxide, sodium isopropoxide, potassium isopropoxide, sodium butoxide, potassium butoxide, sodium sec-butoxide, potassium sec-butoxide, sodium tert-butoxide and potassium tert-butoxide.

It is typical to use from 2 to 4 kg of alkali metal hydroxide per kg of naphthalimide IIa originally used or from 2 to 8 molar equivalents of alkali metal alkoxide, based on IIa.

The oxidizing agent used is preferably oxygen (air) or an aqueous, especially about 5-30% by weight, hydrogen peroxide solution in excess, air being preferred in combination with alkali metal alkoxides and hydrogen peroxide being preferred in combination with alkali metal hydroxides.

The presence of water in at least stoichiometric amounts is essential to complete the hydrolysis reaction.

When alkali metal hydroxides are used as a base it is preferable to add, irrespectively of the oxidizing agent used, from 50 to 100 mol of water when the reaction is carried out in a polar solvent and from 2 to 20 mol of water when the reaction is carried out in an apolar solvent, per mole of naphthalimide IIa originally used.

When alkali metal alkoxides are used as a base, the amount of water required does not depend on the solvent used. The addition of water is obviated when aqueous hydrogen peroxide solutions are used as an oxidizing agent, whereas in the case of an oxidation with air it is preferable to add stoichiometric amounts of water (ie generally from 0.8 to 1.2 mol of water per mole of IIa), preferably continuously and at the same time as the air.

The reaction temperature is customarily in the range from 50 to 180° C. and preferably in the range from 70 to 140° C.

The reaction time depends on the solvent used and on the reaction temperature and is generally in the range from 3 to 10 h and preferably in the range from 4 to 6 h in polar solvents and generally in the range from 0.1 to 2 h and preferably in the range from 0.1 to 0.5 h in apolar solvents.

An advantageous procedure for step b) of the novel process for preparing perylene-3,4:9,10-tetracarboxylic dianhydride is as follows:

The vat salt obtained in step a) is either introduced into the solvent in the form of the moist filter presscake with stirring or dissolved directly off the filter by means of the solvent, admixed with base and optionally water and heated to the desired reaction temperature before air is introduced at this temperature (with or without simultaneous continuous metered addition of stoichiometric amounts of water) or hydrogen peroxide solution is added. The progress of the reaction is discernible from the change in color from blackish violet via deep red to yellowish brown. After cooling to room temperature, the alkali metal salt of perylene-3,4:9,10-tetracarboxylic acid is filtered off, washed neutral with an alcohol such as isopropanol or propanol and dried. For conversion into the dianhydride, the salt is introduced into 30-100 times the amount of dilute aqueous inorganic acid, for example 5-10% by weight hydrochloric acid, briefly boiled up, filtered off after cooling, washed neutral with water and dried.

This process according to the invention is an advantageous way of obtaining perylene-3,4:9,10-tetracarboxylic dianhydride in high yields (customarily >70% by weight, similarly to the preparation of the perylimides I based on the conversion) and in high purities (generally >95%) in a simple, economical manner.

The naphthalimides II used as a starting material for the novel processes for preparing the perylimides I and perylene-3,4:9,10-tetracarboxylic dianhydride can advantageously by the likewise novel process wherein naphthalene-1,8-dicarboxylic anhydride is reacted with primary amines in the presence of a polar aprotic organic solvent and of an organic- or inorganic acid or of an acidic transition metal salt catalyst or in the presence of phenol.

Useful solvents here include polar aprotic organic solvents such as N,N-disubstituted aliphatic carboxamides, especially N,N-di-$C_1$-$C_4$-alkyl-$C_1$-$C_4$-carboxamides, and nitrogenous heterocycles. Phenol is likewise suitable as solvent. It will be appreciated that mixtures of these solvents can be used as well. When a phenol is used as sole solvent, its acidity is generally sufficient and no additional acidic catalyst has to be added.

Examples of preferred solvents include:

N,N-dimethylformamide, N,N-diethylformamide, N,N-dimethylacetamide and N,N-dimethylbutyramide; N-methyl-2-pyrrolidone, quinoline, isoquinoline, quinaldine, pyrimidine, N-methylpiperidine and pyridine; phenol.

Particularly preferred solvents include N,N-dimethylacetamide, N-methyl-2-pyrrolidone and phenol.

The amount of solvent is as such uncritical. It is normal to use from 2 to 6 kg of solvent per kg of naphthalene-1,8-dicarboxylic anhydride.

Useful acidic catalysts include organic acids, especially aliphatic $C_1$-$C_6$-mono- and dicarboxylic acids such as acetic acid, propionic acid and adipic acid, aromatic carboxylic and sulfonic acids such as benzoic acid, benzenesulfonic acid and o-, m- and p-toluenesulfonic acid and inorganic acids such as sulfuric acid and phosphoric acid, which are each preferably used in a very concentrated, anhydrous form, and also organic and inorganic salts of transition metals such as zinc, iron and copper, eg zinc acetate, zinc propionate, zinc oxide, iron(II) acetate, iron(III) chloride, iron(II) sulfate, copper(I) oxide, copper(II) acetate and copper(II) sulfate. It will be appreciated that mixtures of the catalysts mentioned can be used as well.

It is typical to use from 5 to 80% by weight of acidic catalyst, based on naphthalene-1,8-dicarboxylic anhydride. Preferred amounts range from 20 to 60% by weight in the case of the acids and from 10 to 40% by weight in the case of the transition metal salts, the percentages in either case being based on naphthalene-1,8-dicarboxylic anhydride.

The molar ratio of primary amine III to naphthalene-1,8-di-carboxylic anhydride is generally in the range from 1:1 to 3:1 and preferably in the range from 1:1 to 1.5:1.

The reaction temperature is customarily in the range from 0 to 250° C. and especially in the range from 0 to 80° C. in the case of reactive aliphatic amines, in the range from 80 to 160° C. in the case of (cyclo)aliphatic and aromatic amines of medium activity and in the range from 140 to 250° C. in the case of inert aromatic and hetaromatic amines. In the case of temperatures above 120° C., it is advantageous for the reaction to be carried out under a protective gas such as nitrogen.

The reaction of naphthalene-1,8-dicarboxylic dianhydride and primary amine can be carried out at atmospheric pressure or at a superatmospheric pressure of customarily up to 10 bar. Superatmospheric operation is especially advantageous with volatile amines (boiling point 5 reaction temperature).

The reaction time is generally in the range from 0.5 to 15 h and preferably in the range from 1 to 10 h.

A procedure for the novel process for preparing the naphthalimides II is as follows:

The mixture of naphthyne-1,8-dicarboxylic anhydride, amine, solvent and catalyst is heated under nitrogen to the desired reaction temperature for about 0.5-15 h. After cooling to room temperature, the precipitated reaction product is filtered off, washed with cold solvent or an aliphatic alcohol such as methanol and dried.

To carry out the reaction under superatmospheric pressure, a pressure apparatus is used as reaction vessel and, after the components have been introduced, is pressurized to a nitrogen pressure of about 1-2 bar, then heated to the reaction temperature for the desired time, cooled down and depressurized.

By admixing the mother liquor with from 1 to 3 times the amount of methanol it is in both cases possible to recover a further product fraction of less purity. With some naphthalimides II, the yield can be distinctly increased by admixing the reaction mixture (after the reaction has ended) with about 5 times the amount of a dilute inorganic acid, for example a 0.5-1% by weight hydrochloric acid, at from 90 to 100° C. in a gradual manner, subsequently stirred at 90-100° C. for about 1 h, and filtered hot, and the product is washed neutral with hot water and dried at from 100 to 120° C. under reduced pressure. However, recovery of the organic solvent as described hereinbelow is not possible with this version of the process. But excess amine can very largely be isolated in the form of its hydrochloride by salting out with sodium chloride and purified by recrystallization in water or aliphatic alcohols. After the unconverted amine has been released with dilute aqueous base, it can be recycled into the reaction.

In the preferred embodiment of the novel process for preparing the naphthalimides II, the solvent is recovered together with unconverted amine by subjecting the reaction mixture (after the naphthalimide II has been removed) to an extraction or an azeotropic distillation under atmospheric pressure. When such a recyclate is used as solvent, the molar ratio of amine to naphthalene-1,8-dicarboxylic anhydride can be lowered down to 1:1. In the case of the extractive purification, the solvent containing excess amine is advantageously either extracted under alkaline conditions and subsequently dried or passed through an activated carbon/alkali metal hydroxide filter (in which case it is preferable to use solid potassium hydroxide for example).

The process according to the invention provides an advantageous way of preparing all naphthalimides II in high yields (customarily >80%) in a simple, economical manner. Even sterically strongly hindered amines such as 2,6-dimethylaniline, 2,6-diisopropylaniline or 2,6-di-tert-butylaniline and very inert aromatic amines such as p-aminoazobenzene can be used without problems.

The chemical purity of the naphthalimides II prepared according to the invention is generally >97% already. If desired, their purity can be increased to >99% by further purifying steps customary for such compounds such as recrystallization from aliphatic carboxylic acids such as acetic acid, N,N-disubstituted carboxamides such as N,N-dimethylacetamide or nitrogenous heterocycles such as N-methyl-2-pyrrolidone and also halogenated hydrocarbons or fractionation in mineral acids such as sulfuric acid.

EXAMPLES

A) Preparation of Naphthalimides II

Examples 1 to 25

A mixture of 208.6 g (1 mol) of 95% naphthalene-1,8-dicarboxylic anhydride, x mol of the primary amine III, y g of catalyst K and z ml of solvent L was heated to T° C. under nitrogen for t h (in example 1, under the developing autogenous pressure of the volatile amine).

Process Variant V1:

After cooling to room temperature (and depressurizing in the case of example 1), the precipitated reaction product was filtered off with suction (in examples 2, 3, 5, 6, 8, 11-13, 24 and 25, the precipitation of product was first completed by an addition of about the same amount of methanol), washed with the solvent (example 7) or methanol (other examples) until free amine was no longer detectable in the filtrate running off and dried at 100° C. under reduced pressure.

Process Variant V2:

After cooling to about 95° C., the reaction mixture was admixed with 2 l of 0.5% by weight hydrochloric acid over 1 h while the temperature was kept constant and subsequently stirred at that temperature for 1 h. The precipitated reaction product was filtered off hot, washed neutral with hot water and dried at 120° C. under reduced pressure.

Further details concerning these experiments and their results are summarized in table 1. Key:

ZnAc: zinc acetate dihydrate

HAc: acetic acid

NMP: N-Methyl-2-pyrrolidone

DMA: N,N-dimethylacetamide

DMF: N,N-dimethylformamide

TSS: p-toluenesulfonic acid

TABLE 1

| Ex. | V | III | x [mol] | Cat. K | y [g] | L | z [ml] | t [h] | T [° C.] | Yield [%] | Purity [%] | mp. [° C.] | Color |
|---|---|---|---|---|---|---|---|---|---|---|---|---|---|
| 1 | V1 | methylamine | 1.5 | HAc | 100 | NMP | 400 | 4 | 50 | 95 | 98 | 207-208 | colorless |
| 2 | V1 | 5-nonylamine | 1.2 | ZnAc | 80 | NMP | 600 | 3 | 160 | 87 | 98.5 | 73-74 | colorless |
| 3 | V1 | n-dodecyl-amine | 1.05 | ZnAc | 40 | NMP | 800 | 4 | 140 | 92 | 98 | 56-58 | colorless |
| 4 | V1 | N,N-dimethyl-aminopropyl-amine | 1.1 | ZnAc | 60 | NMP | 600 | 3 | 130 | 88 | 97 | 114-116 | colorless |
| 5 | V1 | cyclohexyl-amine | 1.1 | ZnAc | 80 | NMP | 600 | 4 | 125 | 96 | 97.5 | 230-232 | pale yellow |
| 6 | V1 | cyclohexyl-amine | 1.1 | HAc | 100 | NMP | 600 | 4 | 125 | 92 | 98 | 230-232 | pale yellow |
| 7 | V1 | cyclohexyl-amine | 1.1 | — | — | Phenol | 900 | 2 | 140 | 90 | 97 | 229-232 | pale yellow |
| 8 | V1 | cyclohexyl-amine | 1.1 | ZnAc | 80 | DMA | 800 | 4 | 125 | 94 | 98 | 230-232 | pale yellow |
| 9 | V1 | aniline | 1.1 | ZnAc | 60 | NMP | 600 | 3 | 125 | 85 | 98.5 | 201-203 | colorless |
| 10 | V1 | 2-methyl-aniline | 1.1 | ZnAc | 80 | NMP | 600 | 3 | 130 | 81 | 98 | 220-222 | colorless |
| 11 | V1 | 3,5-dimethyl-aniline | 1.2 | ZnAc | 40 | NMP | 400 | 1.5 | 140 | 84 | 98 | 200-201 | colorless |
| 12 | V1 | 3,5-dimethyl-aniline | 1.2 | ZnAc | 80 | quino-line | 1000 | 1.5 | 160 | 61 | 97 | 199-201 | colorless |
| 13 | V2 | 3,5-dimethyl-aniline | 1.2 | ZnAc | 30 | NMP | 400 | 2 | 150 | 99 | 97 | 199-201 | colorless |
| 14 | V1 | 2,6-dimethyl-aniline | 1.1 | ZnAc | 80 | NMP | 400 | 4 | 185 | 84 | 99 | 223-225 | colorless |
| 15 | V1 | 2,6-diiso-propylaniline | 1.0 | ZnAc | 80 | DMA | 1000 | 8 | 155 | 57 | 97 | 295-297 | colorless |
| 16 | V1 | 2,6-diiso-propylaniline | 1.05 | ZnAc | 40 | NMP | 1000 | 8 | 202 | 82 | 98 | 296-298 | colorless |
| 17 | V1 | 2,6-diiso-propylaniline | 1.2 | ZnAc | 80 | quino-line | 1000 | 4 | 230 | 88 | 98.5* | 298-299 | colorless |
| 18 | V1 | 2,6-diiso-propylaniline | 1.2 | ZnAc | 20 | DMF | 1000 | 8 | 150 | 54 | 97* | 295-297 | colorless |
| 19 | V1 | 2,6-diiso-propylaniline | 1.1 | TSS | 50 | NMP | 850 | 8 | 202 | 91 | 98 | 297-299 | colorless |
| 20 | V1 | 2,5-di-tert-butylaniline | 1.1 | ZnAc | 80 | NMP | 850 | 8 | 202 | 85 | 98.5 | 198-200 | colorless |
| 21 | V1 | p-aminoazo-benzene | 1.0 | ZnAc | 80 | NMP | 650 | 4 | 140 | 80 | 98.5 | 278-279 | yellowish orange |
| 22 | V1 | p-aminoazo-benzene | 1.0 | ZnAc | 80 | DMA | 700 | 4 | 140 | 76 | 98 | 277-279 | yellowish orange |
| 23 | V1 | p-aminoazo-benzene | 1.0 | ZnAc | 80 | quino-line | 1000 | 2.5 | 160 | 79 | 98.5 | 278-279 | yellowish orange |
| 24 | V1 | benzylamine | 1.05 | ZnAc | 60 | NMP | 600 | 6 | 130 | 92 | 98 | 194-196 | colorless |
| 25 | V1 | 4-methoxy-benzylamine | 1.05 | ZnAc | 80 | NMP | 600 | 6 | 130 | 87 | 98.5 | 187-188 | colorless |

*after recrystallization from glacial acetic acid

Examples 26 to 28

Recovery of Amine and Solvent

Example 26

Purely Extractive Purification 1 l of the removed solvent-amine mixture of example 16 was repeatedly extracted with a 2% by weight aqueous potassium hydroxide solution until naphthalic acid derivatives were no longer detectable in the aqueous extract, washed hydroxide-free with water and subsequently dried over solid potassium carbonate. The solvent recyclate thus obtained (950 ml) contained 18.3 g/l of 2,6-diisopropylamine and was unconditionally usable for the same reaction (cf. example 29); depending on the amount of apolar impurities in the naphthalic anhydride and/or on the purity of the primary amine used, it was necessary to subject the solvent to a distillative workup as per example 27 or an activated carbon treatment every 2 to 5 cycles.

Examples 27 and 28

Combined Extractive and Distillative Purification 1 l of the removed solvent-amine mixture of example 16 (example 27) or example 21 (example 28) was repeatedly extracted with a 2% by weight aqueous potassium hydroxide solution until naphthalic acid derivatives were no longer detectable in the aqueous extract and subsequently distilled at atmospheric pressure under nitrogen without column; the first cut, which passed over at 180° C., was discarded. 870 ml of a colorless N-methyl-2-pyrrolidone distillate were obtained in example 27 and 840 ml of a yellow quinoline distillate in example 28, which contained 34.2 g of 2,6-diisopropylaniline and 33.1 g of p-aminoazobenzene respectively; the recovery rate for solvent was 95% in both cases and for unconverted amine 84% in example 27 and 81% in example 28.

Example 29

Replication of the Reaction of Example 16 with Purified Solvent of Example 26

Replicating the reaction of example 16 with 1 l of purified solvent of example 26 and 1 mol (reduced from 1.05 mol) of virgin primary amine III added delivered, while all other reaction parameters were maintained the same, 296.2 g of N-2',6'-diisopropylphenylnaphthalene-1,8-dicarboximide (II) as a white crystalline powder having a purity of 98%, corresponding to a yield of 85%.

B) Preparation of Perylimides I

Examples 30 to 83

A solution of 0.1 mol (a g) of naphthalimide II in $b_1$ ml of solvent $L_1$ was heated to $T_1°$ C. under nitrogen with stirring.

At this temperature, x molar equivalents ("meq") (y g) of base B was either metered in as a solution ($L_2$) in 150 ml of tert-butyl alcohol (TBA) or 100 ml of tert-amyl alcohol (TAA) in such a way that the reaction temperature never dropped to more than 5° C. below $T_1°$ C., the lower-boiling cosolvent TBA or TAA as the case may be being continuously distilled off, or added a little at a time as a solid.

The addition of the base was preceded by the addition of NMP phase mediator in an amount of 4.0 g in examples 32 and 33, 3.0 g in examples 42 and 43, 4.5 g in examples 54 and 55, 7.5 g in examples 72 and 73 and 5.0 g in examples 80 and 81.

Following a supplementary stirring time of $t_1$ h at $T_1°$ C. and cooling of the reaction mixture to 30° C. (examples 30-45) or 60° C. (examples 46-83), the blackish violet precipitate was filtered off under protective gas, washed in succession with 200 ml of solvent $L_1$ and also 200 ml of tetrahydrofuran (examples 30-37) or petroleum ether (examples 38-83) and then introduced with stirring into 500 ml of solvent $L_3$ (examples 30-45) or extracted with 750 ml of hot solvent $L_3$ (examples 46-83).

The resulting suspension or solution was adjusted to the particular pH p desired by portionwise addition of glacial acetic acid or half-concentrated sulfuric acid and then reoxidized as per the following process variants, in which the reoxidation could be monitored by observing the change in color from blackish violet to dark red or reddish orange (depending on the substrate used) to constant color:

Process Variant VA: Reoxidation with Hydrogen Peroxide 35 ml of 30% by weight hydrogen peroxide solution were added and the batch was then heated to $T_3°$ C. for $t_3$ h and subsequently supplementarily stirred for 1-2 h after cooling to room temperature.

Process Variant VB: Reoxidation with Atmospheric Oxygen

The batch was heated to $T_3°$ C. and then air was passed in at about 50-60 l/h for $t_3$ h. The batch was subsequently supplementarily stirred for 3-4 h while slowly cooling to room temperature and supplying further air.

The workup was carried out in both the process variants (in examples 30, 31 and 36 after addition of 500 ml of dilute sulfuric acid) by briefly heating to 70-80° C., filtering off the precipitated product, washing initially with water and then with methanol until the liquor running off was neutral and drying at 100° C. under reduced pressure.

Further details concerning these experiments and their results are collated in table 2. The yields reported in parentheses in the case of examples 46-83 are each based on the maximum possible yield of 50%.

Key:
Exxsol: Exxsol® D 80; mixture of high boiling (bp >230° C.) mono- and bicycloalkanes from the petroleum cracking process (Exxon Chemicals Inc.)
B1: potassium tert-butoxide
B2: potassium methoxide
B3: potassium hydroxide
TBA: tert-butyl alcohol
TAA: tert-amyl alcohol
dil. HCl: 5% by weight hydrochloric acid

TABLE 2

| Ex. | V | II of Ex. | a [g] | L₁ | b₁ [ml] | T₁ [°C.] | B | x/y [meq]/[g] | L₂ | t₁ [h] | L₃ | pH p | T₃ [°C.] | t₃ [h] | Yield [g]/[%] | Purity [%] |
|---|---|---|---|---|---|---|---|---|---|---|---|---|---|---|---|---|
| 30 | VA | 1 | 21.1 | decalin | 200 | 120 | B1 | 2.2/24.6 | — | 2.0 | water | 10 | 40 | 4 | 19.2/92 | >95 |
| 31 | VB | 1 | 21.1 | xylene | 300 | 120 | B2 | 2.2/17.5 | — | 5.0 | methanol | 9 | 60 | 2 | 18.8/90 | >95 |
| 32 | VA | 1 | 21.1 | Exxsol | 250 | 130 | B3 | 2.5/13.9 | — | 5.0 | dil. HCl | <1 | 40 | 4 | 18.4/88 | >95 |
| 33 | VA | 1 | 21.1 | xylene | 300 | 130 | B2 | 2.4/19.1 | — | 2.0 | NMP | 6-7 | 60 | 2 | 17.8/85 | >95 |
| 34 | VA | 2 | 32.3 | decalin | 300 | 130 | B2 | 2.4/19.1 | — | 3.5 | methanol | 6-7 | 40 | 4 | 26.7/83 | >98 |
| 35 | VB | 2 | 32.3 | decalin | 300 | 130 | B1 | 2.1/23.5 | — | 2.0 | glacial acetic acid | 2-3 | 50 | 3 | 24.1/75 | >98 |
| 36 | VA | 3 | 36.6 | decalin | 300 | 130 | B1 | 2.1/23.5 | — | 2.0 | methanol | 9 | 40 | 4 | 30.9/85 | >98 |
| 37 | VB | 3 | 36.6 | decalin | 300 | 130 | B1 | 2.1/23.5 | — | 2.0 | glacial acetic acid | 2-3 | 50 | 3 | 29.8/82 | >98 |
| 38 | VA | 4 | 28.2 | xylene | 500 | 130 | B1 | 2.2/24.6 | — | 2.0 | water | 5-6 | 40 | 4 | 21.3/76 | >95 |
| 39 | VA | 4 | 28.2 | Exxsol | 450 | 140 | B1 | 2.2/24.6 | TBA | 0.5 | methanol | 5-6 | 40 | 4 | 21.9/78 | >95 |
| 40 | VA | 6 | 27.9 | mesitylene | 200 | 120 | B2 | 2.4/19.1 | — | 1.0 | dil. HCl | <1 | 40 | 4 | 21.1/76 | >98 |
| 41 | VB | 6 | 27.9 | mesitylene | 200 | 120 | B2 | 2.4/19.1 | — | 1.0 | dil. HCl | <1 | 60 | 2 | 20.5/74 | >98 |
| 42 | VA | 6 | 27.9 | Exxsol | 250 | 120 | B2 | 2.2/17.5 | — | 0.5 | glacial acetic acid | 2-3 | 40 | 4 | 23.6/85 | >98 |
| 43 | VB | 6 | 27.9 | Exxsol | 250 | 120 | B2 | 2.2/17.5 | — | 0.5 | glacial acetic acid | 2-3 | 50 | 3 | 23.0/83 | >98 |
| 44 | VA | 6 | 27.9 | decalin | 200 | 120 | B1 | 2.2/24.6 | TBA | 0.5 | glacial acetic acid | 2-3 | 40 | 4 | 25.0/90 | >98 |
| 45 | VB | 6 | 27.9 | decalin | 200 | 120 | B1 | 2.2/24.6 | TBA | 0.5 | glacial acetic acid | 2-3 | 50 | 3 | 24.4/88 | >98 |
| 46 | VA | 9 | 27.3 | decalin | 400 | 180 | B1 | 2.1/23.5 | — | 0.5 | water | 3-4 | 40 | 4 | 11.7/(86) | >95 |
| 47 | VB | 9 | 27.3 | decalin | 400 | 180 | B1 | 2.1/23.5 | — | 0.5 | water | 3-4 | 50 | 3 | 11.4/(84) | >95 |
| 48 | VA | 10 | 28.7 | xylene | 400 | 160 | B1 | 2.2/24.6 | — | 2.0 | water | 3-4 | 40 | 4 | 13.0/(91) | >98 |
| 49 | VB | 10 | 28.7 | xylene | 400 | 160 | B1 | 2.2/24.6 | — | 2.0 | water | 3-4 | 50 | 3 | 12.0/(87) | >98 |
| 50 | VA | 10 | 28.7 | decalin | 400 | 160 | B1 | 2.1/23.5 | TAA | 1.0 | methanol | 3-4 | 40 | 4 | 13.3/(93) | >98 |
| 51 | VB | 10 | 28.7 | decalin | 400 | 160 | B1 | 2.1/23.5 | TAA | 1.0 | methanol | 3-4 | 50 | 3 | 12.7/(89) | >98 |
| 52 | VA | 13 | 30.1 | mesitylene | 500 | 180 | B1 | 2.2/24.6 | — | 1.0 | water | 3-4 | 40 | 4 | 12.4/(83) | >98 |
| 53 | VB | 13 | 30.1 | mesitylene | 500 | 180 | B1 | 2.2/24.6 | — | 1.0 | water | 3-4 | 50 | 3 | 12.1/(81) | >98 |
| 54 | VA | 13 | 30.1 | Exxsol | 500 | 180 | B2 | 2.2/17.5 | — | 0.5 | water | 3-4 | 40 | 4 | 11.7/(78) | >95 |
| 55 | VB | 13 | 30.1 | Exxsol | 500 | 180 | B2 | 2.2/17.5 | — | 0.5 | water | 3-4 | 50 | 3 | 11.5/(77) | >95 |
| 56 | VA | 13 | 30.1 | decalin | 500 | 180 | B1 | 2.1/23.5 | TAA | 0.5 | water | 3-4 | 40 | 4 | 13.0/(87) | >95 |
| 57 | VB | 13 | 30.1 | decalin | 500 | 180 | B1 | 2.1/23.5 | TAA | 0.5 | water | 3-4 | 50 | 3 | 12.6/(84) | >95 |
| 58 | VA | 14 | 30.1 | Exxsol | 400 | 180 | B1 | 2.1/23.5 | — | 2.0 | water | 3-4 | 50 | 3 | 12.4/(83) | >98 |
| 59 | VB | 14 | 30.1 | Exxsol | 400 | 180 | B1 | 2.1/23.5 | — | 2.0 | water | 3-4 | 60 | 2 | 12.6/(84) | >98 |
| 60 | VA | 14 | 30.1 | decalin | 350 | 180 | B1 | 2.1/23.5 | TAA | 1.0 | water | 3-4 | 50 | 3 | 13.3/(89) | >98 |
| 61 | VB | 14 | 30.1 | decalin | 350 | 180 | B1 | 2.1/23.5 | TAA | 1.0 | water | 3-4 | 60 | 2 | 13.2/(88) | >98 |
| 62 | VA | 16 | 35.7 | decalin | 350 | 180 | B1 | 2.1/23.5 | — | 2.0 | methanol | 3-4 | 50 | 3 | 15.3/(86) | >98 |
| 63 | VB | 16 | 35.7 | decalin | 350 | 180 | B1 | 2.1/23.5 | — | 2.0 | methanol | 3-4 | 60 | 2 | 14.8/(83) | >98 |
| 64 | VA | 16 | 35.7 | decalin | 400 | 180 | B1 | 2.1/23.5 | TAA | 0.5 | water | 3-4 | 50 | 3 | 16.3/(92) | >98 |
| 65 | VB | 16 | 35.7 | decalin | 400 | 180 | B1 | 2.1/23.5 | TAA | 0.5 | water | 3-4 | 60 | 2 | 16.0/(90) | >98 |
| 66 | VA | 20 | 38.6 | mesitylene | 300 | 160 | B1 | 2.2/24.6 | — | 2.0 | methanol | 3-4 | 50 | 3 | 16.1/(84) | >98 |
| 67 | VB | 20 | 38.6 | mesitylene | 300 | 160 | B1 | 2.2/24.6 | — | 2.0 | methanol | 3-4 | 60 | 2 | 16.1/(84) | >98 |
| 68 | VA | 20 | 38.6 | decalin | 400 | 180 | B1 | 2.1/23.5 | TAA | 1.0 | water | 3-4 | 50 | 3 | 16.7/(87) | >98 |
| 69 | VB | 20 | 38.6 | decalin | 400 | 180 | B1 | 2.1/23.5 | TAA | 1.0 | water | 3-4 | 60 | 2 | 16.3/(85) | >98 |
| 70 | VA | 21 | 37.7 | Exxsol | 800 | 200 | B1 | 2.1/23.5 | — | 3.0 | water | 5-6 | 30 | 6 | 14.5/(77) | >95 |
| 71 | VB | 21 | 37.7 | Exxsol | 800 | 200 | B1 | 2.1/23.5 | — | 3.0 | water | 5-6 | 30 | 6 | 14.3/(76) | >95 |
| 72 | VA | 21 | 37.7 | decalin | 600 | 180 | B2 | 2.2/17.5 | — | 2.0 | water | 5-6 | 30 | 6 | 15.2/(81) | >95 |
| 73 | VB | 21 | 37.7 | decalin | 600 | 180 | B2 | 2.2/17.5 | — | 2.0 | water | 5-6 | 30 | 6 | 14.8/(79) | >95 |
| 74 | VA | 21 | 37.7 | decalin | 750 | 180 | B1 | 2.1/23.5 | TAA | 1.0 | water | 5-6 | 30 | 6 | 15.4/(82) | >95 |
| 75 | VB | 21 | 37.7 | decalin | 750 | 180 | B1 | 2.1/23.5 | TAA | 1.0 | water | 5-6 | 30 | 6 | 15.4/(82) | >95 |
| 76 | VA | 24 | 28.7 | Exxsol | 500 | 160 | B1 | 2.1/23.5 | — | 2.0 | water | 3-4 | 40 | 4 | 11.3/(79) | >96 |
| 77 | VB | 24 | 28.7 | decalin | 500 | 160 | B1 | 2.1/23.5 | — | 2.0 | water | 3-4 | 60 | 2 | 11.1/(78) | >96 |
| 78 | VA | 25 | 31.7 | mesitylene | 600 | 160 | B1 | 2.2/24.6 | — | 2.5 | water | 3-4 | 40 | 4 | 11.7/(74) | >96 |
| 79 | VB | 25 | 31.7 | mesitylene | 600 | 160 | B1 | 2.2/24.6 | — | 2.5 | water | 3-4 | 60 | 2 | 11.4/(72) | >96 |
| 80 | VA | 25 | 31.7 | decalin | 500 | 180 | B2 | 2.2/17.5 | — | 1.0 | water | 3-4 | 40 | 4 | 12.1/(77) | >96 |
| 81 | VB | 25 | 31.7 | decalin | 500 | 180 | B2 | 2.2/17.5 | — | 1.0 | water | 3-4 | 60 | 2 | 12.1/(77) | >96 |
| 82 | VA | 25 | 31.7 | decalin | 600 | 180 | B1 | 2.1/23.5 | TAA | 0.5 | water | 3-4 | 40 | 4 | 13.4/(85) | >96 |
| 83 | VB | 25 | 31.7 | decalin | 600 | 180 | B1 | 2.1/23.5 | TAA | 0.5 | water | 3-4 | 60 | 2 | 12.9/(82) | >96 |

Examples 84 to 87

Quasicontinuous Mode

A solution of 0.1 mol of the naphthalimides II of examples 1 (21.1 g; example 84), 6 (27.9 g; example 85), 13 (30.1 g; example 86) and 16 (35.7 g; example 87) in, in each case, 500 ml of hot decalin at 120° C. was continuously mixed and reacted with a likewise 120° C. solution of 0.22 mol (24.6 g) of potassium tert-butoxide in 400 ml of decalin in a tubular reactor having a Y-shaped mixing nozzle (1 mm in internal diameter) at 180° C. The rates of addition of the two solutions and the tube dimensions were chosen so as to give reactor residence times of 120 sec.

Each reaction mixture emerging from the reactor was quenched to 50° C., reoxidized with hydrogen peroxide as per process variant VA and worked up as described above.

The corresponding perylimides I were obtained in amounts of 19.0 g (example 84), 22.7 g (example 85), 12.0 g (example 86) and 15.5 g (example 87), corresponding to conversion-based yields of 91%, 82%, 80% and 87% respectively. The product purities were >95% (examples 84 and 86) and >98% (examples 85 and 87).

Examples 88 and 89

Recovery of Naphthalimide II

Recrystallizing the filtercake of example 56 (example 88) or example 64 (example 28), which remained after the extraction of the vat salt at the end of the dimerization, from N-methyl-2-pyrrolidone delivered respectively 15.4 g and 17.0 g of the corresponding unconverted naphthalimide II having a purity >97%, which corresponds to a recovery rate of 90% (example 88) or 88% (example 89).

Example 90

Replicating the Reaction of Example 64 with Purified Naphthalimide of Example 89

Replicating the reaction of example 64 with 35.7 g of purified N-(2,6-diisopropylphenyl)naphthalimide of example 89 delivered 16.2 g of N,N'-bis(2,6-diisopropylphenyl)perylene-3,4:9,10-tetracarboxylic diimide as a crystalline reddish orange powder having a purity >98%, which corresponds to a yield of 91%.

B) Preparation of perylene-3,4:9,10-tetracarboxylic dianhydride

Example 91

The N,N'-dicyclohexylperylene-3,4:9,10-tetracarboxylic diimide vat salt obtained as per the procedure described in example 44 was with stirring suspended in 500 ml of toluene, admixed with a total of 0.4 mol (27.2 g) of sodium ethoxide added a little at a time and heated to 100° C. At 100° C., a total of 60 ml of 15% by weight hydrogen peroxide solution was metered in continuously with stirring over a period of 20 min.

Following a supplementary stirring time of 10 min and cooling to room temperature, the resulting yellowish brown precipitate was filtered off, washed neutral with isopropanol, introduced into 50 times the amount of 10% by weight hydrochloric acid, heated to the boil for 10 min, cooled to room temperature, filtered off, washed neutral with water and dried.

This delivered 17.3 g of perylene-3,4:9,10-tetracarboxylic dianhydride as a dark red amorphous powder having a purity >97%, which corresponds to a yield of 88%.

Example 92

The N,N'-bis(3,5-dimethylphenyl)perylene-3,4:9,10-tetracarboxylic diimide vat salt obtained as per the procedure described in example 56 was extracted with a total of 600 ml of hot oxygen-free 4:1 isopropanol/water at 60° C. from the filtercake of the dimerization reaction and admixed with 90 g of potassium hydroxide.

Following a supplementary stirring time of 5 h at 80° C. and cooling to room temperature, the resulting yellowish brown precipitate was filtered off, washed neutral with isopropanol, introduced into 50 times the amount of 10% by weight hydrochloric acid, heated to the boil for 10 min, cooled to room temperature, filtered off, washed neutral with water and dried.

This delivered 8.2 g of perylene-3,4:9,10-tetracarboxylic dianhydride as a dark red amorphous powder having a purity >98%, which corresponds to a yield of 84%, based on the maximum possible conversion of 50%.

We claim:

1. A process for preparing perylene-3,4:9,10-tetracarboxylic dianhydride, comprising:

dimerizing a naphthalene-1,8-dicarboximide of the formula IIa;

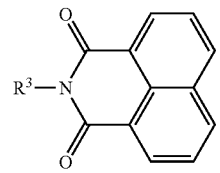

IIa effecting the subsequent reoxidation of the resulting alkali metal salt of the leuco form of the perylene-3,4:9,10-tetracarboxylic diimide of the formula Ia;

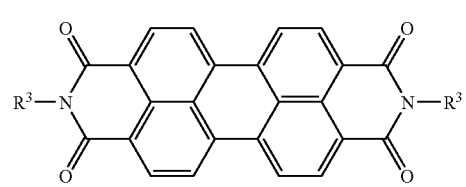

Ia hydrolyzing the diimide to the tetraalkali metal salt of perylene-3,4:9,10-tetracarboxylic acid in the presence of an inert organic solvent, of an alkali metal base and of water; and subjecting the tetraalkali metal salt of perylene-3,4:9,10-tetracarboxylic acid to the action of an aqueous inorganic acid to convert it into perylene-3,4:9,10-tetracarboxylic dianhydride; wherein $R^3$ is cyclohexyl or phenyl which may each be substituted by up to three $C_1$-$C_4$-alkyl radicals, and the dimerizing is in a substantially homogeneous reaction medium consisting essentially of an apolar aprotic organic solvent and an alkali metal base.

2. A process for preparing naphthalene-1,8-dicarboximides of the general formula II

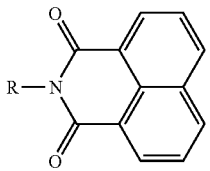

wherein R is
- $C_1$-$C_{30}$-alkyl whose carbon chain may be interrupted by one or more —O— moieties and/or which may be substituted by one or more substituents selected from the group consisting of $C_5$-$C_8$-cycloalkyl (which may be substituted by one or more $C_1$-$C_6$-alkyl substituents), phenyl or phenyl-$C_1$-$C_6$-alkyl (which may each be substituted by one or more $C_1$-$C_{18}$-alkyl and/or $C_1$-$C_6$-alkoxy substituents), —OCOR$^1$, —N(R$^1$)$_2$, —SO$_2$NH$_2$, —SO$_2$N(R$^1$)$_2$, —CON(R$^1$)$_2$ and —COOR$^1$;
- $C_5$-$C_8$-cycloalkyl whose carbon scaffold may be interrupted by one or more moieties selected from the group consisting of —O—, —S— and —NR$^2$— and/or which may be substituted by one or more $C_1$-$C_6$-alkyl substituents;
- phenyl, phenyl-$C_1$-$C_6$-alkyl, naphthyl or hetaryl, which may each be substituted by one or more substituents selected from the group consisting of $C_1$-$C_{18}$-alkyl, $C_1$-$C_6$-alkoxy, phenylazo, naphthylazo, pyridylazo, pyrimidylazo, cyano, —N(R$^1$)$_2$, —CON(R$^1$)$_2$ and —COOR$^1$;
- R$^1$ is $C_1$-$C_6$-alkyl, $C_5$-$C_8$-cycloalkyl, phenyl or phenyl-$C_1$-$C_6$-alkyl;
- R$^2$ is $C_1$-$C_6$-alkyl, phenyl or phenyl-$C_1$-$C_6$-alkyl, comprising reacting naphthalene-1,8-dicarboxylic anhydride with a primary amine of the general formula III

R—NH$_2$  III wherein said reacting is in the presence of a polar aprotic organic solvent and one selected from the group consisting of an acidic transition metal salt catalyst and phenol.

3. The process as claimed in claim 2, further comprising:
after removing the naphthalene-1,8-dicarboximide II and its hydrolysis products from the reaction mixture subjecting the reaction mixture after removal to an extraction or an azeotropic distillation under atmospheric pressure to recover the organic solvent together with unconverted amine for further reactions.

4. Naphthalene-1,8-dicarboximides represented by general formula IIb

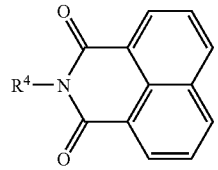

wherein:
- R$^4$ is
- $C_1$-$C_{30}$-alkyl which is substituted by one or more substituents selected from the group consisting of $C_5$-$C_8$-cycloalkyl (which may be substituted by one or more $C_1$-$C_6$-alkyl substituents), phenyl or phenyl-$C_1$-$C_6$-alkyl (which may each be substituted by one or more $C_1$-$C_{18}$-alkyl and/or $C_1$-$C_6$-alkoxy substituents), —SO$_2$NH$_2$, —SO$_2$N(R$^1$)$_2$, —CON(R$^1$)$_2$ and —COOR$^1$ and whose carbon chain may be interrupted by one or more —O— moieties;
- $C_5$-$C_8$-cycloalkyl whose carbon skeleton is interrupted by one or more moieties selected from the group consisting of —O—, —S— and —NR$^2$— and/or is substituted by one or more $C_1$-$C_6$-alkyl substituents;
- phenyl or phenyl-$C_1$-$C_6$-alkyl which are each substituted by one or more substituents selected from the group consisting of $C_1$-$C_{18}$-alkyl, $C_1$-$C_6$-alkoxy, phenylazo, naphthylazo, pyridylazo, pyrimidylazo, cyano, —CON(R$^1$)$_2$ and —COOR$^1$;
- naphthyl, 2- or 3-pyrryl, 2-, 3- or 4-pyridyl, 2-, 4- or 5-pyrimidyl, 3-, 4- or 5-pyrazolyl, 6-quinaldyl, 3,5-, 6- or 8-quinolinyl, 2-benzoxazolyl, 5-benzothiadiazolyl, or 1- or 5-isoquinolyl which may each be substituted by one or more substituents selected from the group consisting of $C_1$-$C_{18}$-alkyl, $C_1$-$C_6$-alkoxy, phenylazo, naphthylazo, pyridylazo, pyrimidylazo, cyano, —CON(R$^1$)$_2$ and —COOR$^1$;
- R$^1$ is $C_1$-$C_6$-alkyl, $C_5$-$C_8$-cycloalkyl, phenyl or phenyl-$C_1$-$C_6$-alkyl;
- R$^2$ is $C_1$-$C_6$-alkyl, phenyl or phenyl-$C_1$-$C_6$-alkyl.

* * * * *